(12) United States Patent
Bak et al.

(10) Patent No.: US 12,379,870 B2
(45) Date of Patent: Aug. 5, 2025

(54) STORAGE DEVICE FOR A PLURALITY OF META DATA AND METHOD OF OPERATING THE SAME

(71) Applicant: SK hynix Inc., Icheon-si (KR)

(72) Inventors: Je Uk Bak, Icheon-si (KR); Soong Sun Shin, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 114 days.

(21) Appl. No.: 18/297,022

(22) Filed: Apr. 7, 2023

(65) Prior Publication Data

US 2024/0143223 A1    May 2, 2024

(30) Foreign Application Priority Data

Oct. 27, 2022   (KR) .................. 10-2022-0140578

(51) Int. Cl.
*G06F 3/06*     (2006.01)
(52) U.S. Cl.
CPC .......... *G06F 3/0658* (2013.01); *G06F 3/0607* (2013.01); *G06F 3/0683* (2013.01)
(58) Field of Classification Search
CPC ........ G06F 3/06; G06F 3/0604; G06F 3/0607; G06F 3/061; G06F 3/0658; G06F 3/0659; G06F 3/0683; G06F 2212/1016
See application file for complete search history.

(56) References Cited

U.S. PATENT DOCUMENTS

| | | | |
|---|---|---|---|
| 9,075,733 B1* | 7/2015 | Feldman | G06F 3/064 |
| 11,500,479 B2* | 11/2022 | Hines | G06F 3/03545 |
| 2013/0013561 A1* | 1/2013 | Chan | G06F 16/172 |
| | | | 707/825 |
| 2017/0206131 A1* | 7/2017 | Christensen | G06F 3/064 |
| 2022/0171569 A1* | 6/2022 | Um | G06F 3/0688 |
| 2024/0104114 A1* | 3/2024 | Singh | G06F 16/258 |

FOREIGN PATENT DOCUMENTS

| | | |
|---|---|---|
| KR | 10-2013-0019891 A | 2/2013 |
| KR | 10-2020-0086143 A | 7/2020 |

* cited by examiner

*Primary Examiner* — Aracelis Ruiz

(57) ABSTRACT

A storage device includes a plurality of memory devices, a plurality of cores controlling the plurality of memory devices, and a host interface configured to select a first core of the plurality of cores to store a plurality of meta data in a memory device controlled by the first core, and configured to switch to a second core from the plurality of cores to store the plurality of meta data in a memory device controlled by the second core, when the number of operations for storing a first meta data, from among the plurality of meta data, by the first core exceeds a threshold value.

13 Claims, 8 Drawing Sheets

STORAGE DEVICE FOR A PLURALITY OF META DATA AND METHOD OF OPERATING THE SAME

CROSS-REFERENCE TO RELATED APPLICATION

The present application claims priority under 35 U.S.C. § 119 (a) to Korean patent application number 10-2022-0140578, filed on Oct. 27, 2022, in the Korean Intellectual Property Office, the entire disclosure of which is incorporated herein by reference.

BACKGROUND

1. Field of Invention

The present disclosure relates to an electronic device, and more particularly, to a storage device and a method of operating the same.

2. Description of Related Art

A storage device is a device that stores data under control of a host device such as a computer or a smartphone. A storage device may include a memory device storing data and a memory controller controlling the memory device. The memory devices may be classified into volatile memory devices and nonvolatile memory devices.

Volatile memory devices may be devices that store data only when power is supplied and loses the stored data when the power supply is cut off. A volatile memory device may include a static random access memory (SRAM), a dynamic random access memory (DRAM), and the like.

Nonvolatile memory devices may be devices that do not lose data even though power is cut off. A nonvolatile memory device may include a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a storage device that reduces a time required for a booting operation and has an improved lifespan, and a method of operating the same.

According to an embodiment of the present disclosure, a storage device includes a plurality of memory devices, a plurality of cores controlling the plurality of memory devices, and a host interface configured to select a first core of the plurality of cores to store the plurality of meta data in a memory device controlled by the first core, and configured to switch to a second core from the plurality of cores to store the plurality of meta data in a memory device controlled by the second core, when the number of operations for storing a first meta data, from among the plurality of meta data, by the first core exceeds a threshold value.

According to an embodiment of the present disclosure, a storage device includes a first memory device, a second memory device, a first core configured to control the first memory device, a second core configured to control the second memory device, and a host interface configured to select the first core to store a plurality of meta data in the first memory device, and to select the second core to store the plurality of meta data in the second memory device, when the number of operations for storing a first meta data from among the plurality of meta data by the first core exceeds a threshold value.

According to an embodiment of the present disclosure, a storage device includes a memory device including a plurality of memory areas, a plurality of memory area controllers respectively controlling the plurality of memory areas, and a host interface configured to select a first memory area controller to store a plurality of meta data in the plurality of memory areas from among the plurality of memory area controllers based on a number of operations for storing a first meta data from among the plurality of meta data by a second memory area controller from among the plurality of memory area controllers.

According to the present technology, a storage device that reduces a time required for a booting operation and has an improved lifespan, and a method of operating the same are provided.

DETAILED DESCRIPTION

Specific structural or functional descriptions of embodiments according to the concepts that are disclosed in the present specification or application are illustrated only to describe the embodiments according to the concepts of the present disclosure. The embodiments according to the concepts of the present disclosure may be carried out in various forms and should not be construed as being limited to the embodiments described in the present specification or application.

Figure 1:
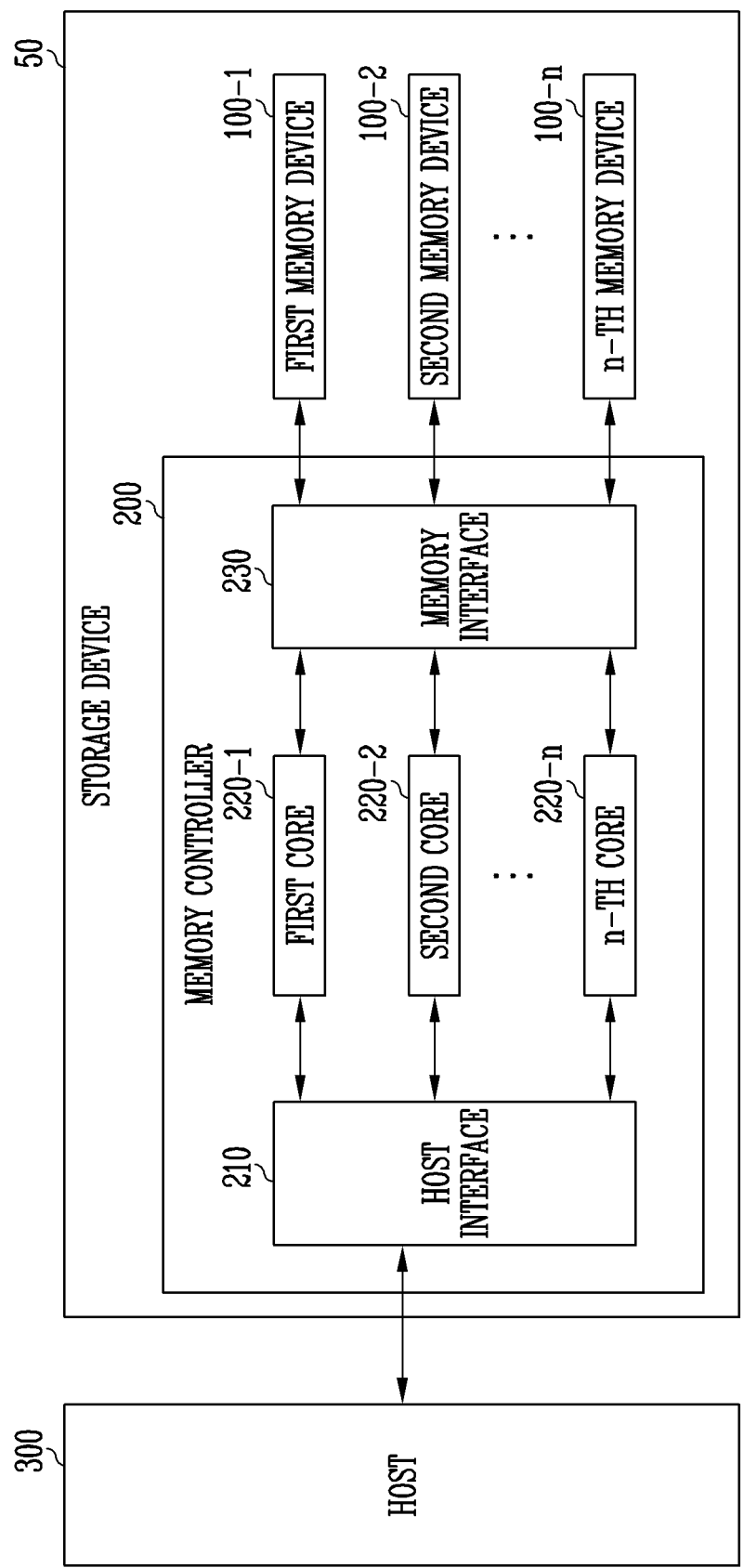
FIG. 1 is a diagram illustrating a storage device according to an embodiment of the present disclosure.

FIG. 1 is a diagram illustrating a storage device according to an embodiment of the present disclosure.

Referring to FIG. 1, a storage device 50 may include a plurality of memory devices 100-1 to 100-*n* and a memory controller 200 that controls an operation of the plurality of memory devices 100-1 to 100-*n*. The storage device 50 may be a device that stores data under control of a host 300 such as a cellular phone, a smartphone, an MP3 player, a laptop computer, a desktop computer, a game player, a TV, a tablet PC, or an in-vehicle infotainment system.

The storage device 50 may be manufactured as any one of various types of storage devices or may be manufactured as any one of various types of packages according to a communication method with the host 300.

The plurality of memory devices 100-1 to 100-*n* may store data. The plurality of memory devices 100-1 to 100-*n* may include a memory cell array (not shown) including a plurality of memory cells that store data. The memory cells may be configured of a single level cell (SLC), a multi-level cell (MLC), a triple level cell (TLC), or a quad level cell (QLC).

The memory cell array (not shown) may include a plurality of memory blocks. Each memory block may include a plurality of memory cells. One memory block may include a plurality of pages. In an embodiment, the page may be a unit for storing data in the plurality of memory devices 100-1 to 100-*n* or reading data stored in the plurality of memory devices 100-1 to 100-*n*. The memory block may be a unit for erasing data.

The plurality of memory devices 100-1 to 100-*n* may receive a command CMD and an address ADDR from the memory controller 200, and perform an operation instructed by the command CMD on an area selected by the address in the memory cell array.

The memory controller 200 may control an overall operation of the storage device 50.

When power is applied to the storage device 50, the memory controller 200 may execute firmware (FW). When the plurality of memory devices 100-1 to 100-*n* are flash memory devices, the firmware (FW) may include a host interface layer (HIL) that controls communication with the host 300, a flash translation layer (FTL) that controls communication between the host 300 and the plurality of memory devices 100-1 to 100-*n*, and a flash interface layer (FIL) that controls communication with the plurality of memory devices 100-1 to 100-*n*.

In an embodiment, the memory controller 200 may receive data and a logical block address (LBA) from the host 300 and may convert the LBA into a physical block address (PBA) indicating an address of memory cells in which data is to be stored in the plurality of memory devices 100-1 to 100-*n*. In the present specification, the LBA and a "logic address" or a "logical address" may be used with the same meaning. In the present specification, the PBA and a "physical address" may be used with the same meaning.

The memory controller 200 may provide a command, an address, or data corresponding to a corresponding operation to the plurality of memory devices 100-1 to 100-*n* to perform a write operation, a read operation, or an erase operation according to a request of the host 300.

In an embodiment, the memory controller 200 may be connected to the plurality of memory devices 100-1 to 100-*n* through a channel.

In an embodiment, the memory controller 200 may control the plurality of memory devices 100-1 to 100-*n* according to an interleaving method to improve operation performance. The interleaving method may be a method of controlling operations for the plurality of memory devices 100-1 to 100-*n* to overlap with each other.

In an embodiment, the memory controller 200 may include a host interface 210, a plurality of cores 220-1 to 220-*n*, and a memory interface 230.

The host interface 210 may control communication of the host 300 and the memory controller 200. For example, the host interface 210 may drive the HIL.

In an embodiment, the host interface 210 may control the communication of the host 300 and the memory controller 200 based on a plurality of meta data.

The meta data may indicate data for managing user data or data generated in the storage device 50 to manage the plurality of memory devices 100-1 to 100-*n*. For example, the meta data may include at least one of mapping information used to convert the logical address into the physical address, memory block information indicating information of pages included in the memory blocks of the plurality of memory devices 100-1 to 100-*n*, trim data indicating data deleted from the host 300, and other various pieces of information for managing a memory space of the plurality of memory devices 100-1 to 100-*n*. In an embodiment, the meta data may be a concept including meta data for meta data. When a size of one meta data is greater than a unit stored in the memory device, the one meta data may be divided into a plurality of meta data and generated. In addition, the plurality of meta data may be generated according to a type of information included in the meta data.

In an embodiment, the host interface 210 may select a core among the plurality of cores 220-1 to 220-*n* to store the plurality of meta data in a memory device controlled by the selected core or to read the plurality of meta data stored in a memory device controlled by the selected core.

In an embodiment, first meta data among the plurality of meta data may be meta data including the number of storages of each of the plurality of meta data other than first meta data. That is, the number of storages of each of the plurality of meta data may be stored only in the first meta data. The number of storages may mean the number of operations for storing the meta data in the memory device by the core. According to an embodiment, the number of storages may be referred to as "the number of writes", "the number of programs", "the number of updates", or the like. In addition, the first meta data may be stored in a size capable of being read from the plurality of memory devices 100-1 to 100-*n* according to the interleaving method. For example, assuming that one core reads data stored in the memory device in a page unit and transfers the data to the host interface 210, the first meta data may be stored in a size corresponding to one page. In this case, the plurality of cores 220-1 to 220-*n* may control the plurality of memory devices 100-1 to 100-*n* to read the first meta data stored in the plurality of memory devices 100-1 to 100-*n* according to the interleaving method.

According to an embodiment of the present disclosure, a memory device in which each of remaining meta data, which is meta data other than the first meta data, is stored may be identified based on the number of storages included in the first meta data that results after determining the most recently stored first meta data. At this time, the most recently stored first meta data may mean the most recently updated first meta data.

The plurality of cores 220-1 to 220-*n* may control the plurality of memory devices 100-1 to 100-*n*. For example, a first core 220-1 may control a first memory device 100-1, a second core 220-2 may control a second memory device 100-2, and an n-th core 220-*n* may control an n-th memory device 100-*n*. The plurality of cores 220-1 to 220-*n* may control the plurality of memory devices 100-1 to 100-*n* according to the request input from the host 300 through the host interface 210. Each of the plurality of cores 220-1 to 220-*n* may drive the FTL. The plurality of cores 220-1 to 220-*n* may convert the logical address input from the host 300 into the physical address and generate a command corresponding to the request of the host 300. The plurality of cores 220-1 to 220-n may provide the command, the address, or the data to the plurality of memory devices 100-1 to 100-n or receive data read from the plurality of memory devices 100-1 to 100-n through the memory interface 230.

The memory interface 230 may control communication between the plurality of cores 220-1 to 220-n and the plurality of memory devices 100-1 to 100-n. For example, the memory interface 230 may drive the FIL.

The host 300 may communicate with the storage device 50 using at least one of various communication methods.

Figure 2:
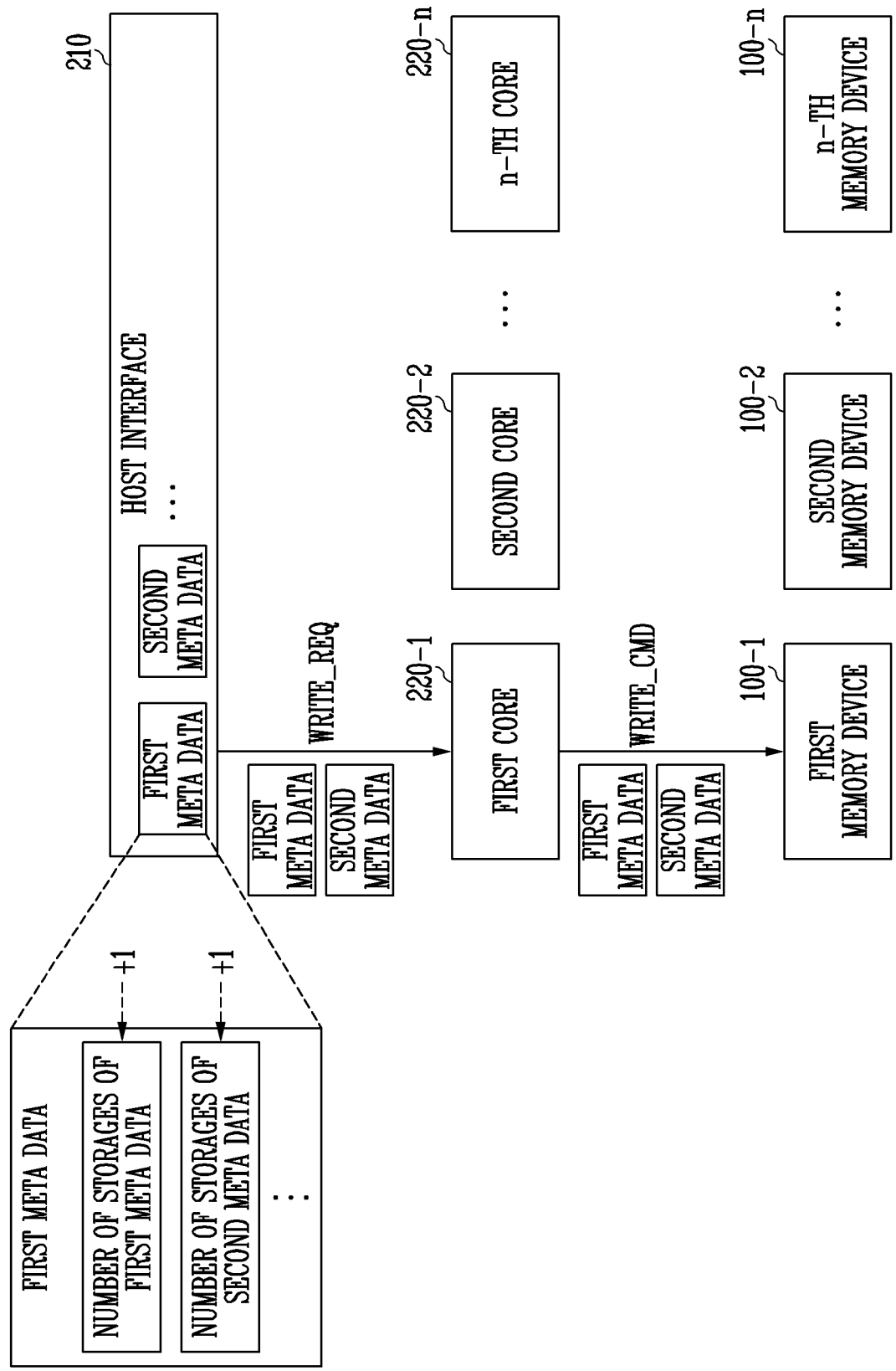
FIG. 2 is a diagram illustrating an example of storing a plurality of meta data using any one core according to an embodiment of the present disclosure.

FIG. 2 is a diagram illustrating an example of storing a plurality of meta data using any one core according to an embodiment of the present disclosure.

Referring to FIG. 2, a host interface 210 may select the first core 220-1 to store the plurality of meta data in the first memory device 100-1. The host interface 210 may provide the meta data to be stored and a write request WRITE_REQ for requesting storage of the meta data to the first core 220-1. The first core 220-1 may generate a write command WRITE_CMD corresponding to the write request WRITE_REQ, and provide the meta data to be stored and the write command WRITE_CMD to the first memory device 100-1.

In an embodiment, the first core 220-1 may control the first memory device 100-1 to store the first meta data together when storing meta data other than the first meta data. For example, when storing second meta data different from first meta data, the first memory device 100-1 may store the first and second meta data together. The host interface 210 may provide a write request for the first meta data as well as the second meta data to the first core 220-1. The first core 220-1 may control the first memory device 100-1 to store the first meta data and the second meta data.

In an embodiment, when storing the plurality of meta data, the host interface 210 may increase the number of storages of each of the plurality of meta data. For example, when storing the first meta data in the first memory device 100-1 using the first core 220-1, the host interface 210 may provide the first meta data to the first core 220-1 after increasing the number of storages of the first meta data. The updated number of storages is included in the first meta data before providing the first meta data to the first core 220-1.

When storing the remaining meta data other than the first meta data, the host interface 210 may increase the number of storages of the remaining meta data and include the number of storages in the first meta data. For example, when storing the second meta data in the first memory device 100-1 using the first core 220-1, the host interface 210 may increase the number of storages of the second meta data. The number of storages, for both the first and second meta data, are included in the first meta data. In addition, since the first meta data is stored together with the remaining meta data, the host interface 210 may also increase the number of storages of the first meta data. The first meta data may be provided to the first core 220-1 after the number of storages of the first meta data and the second meta data is increased.

Figure 3:
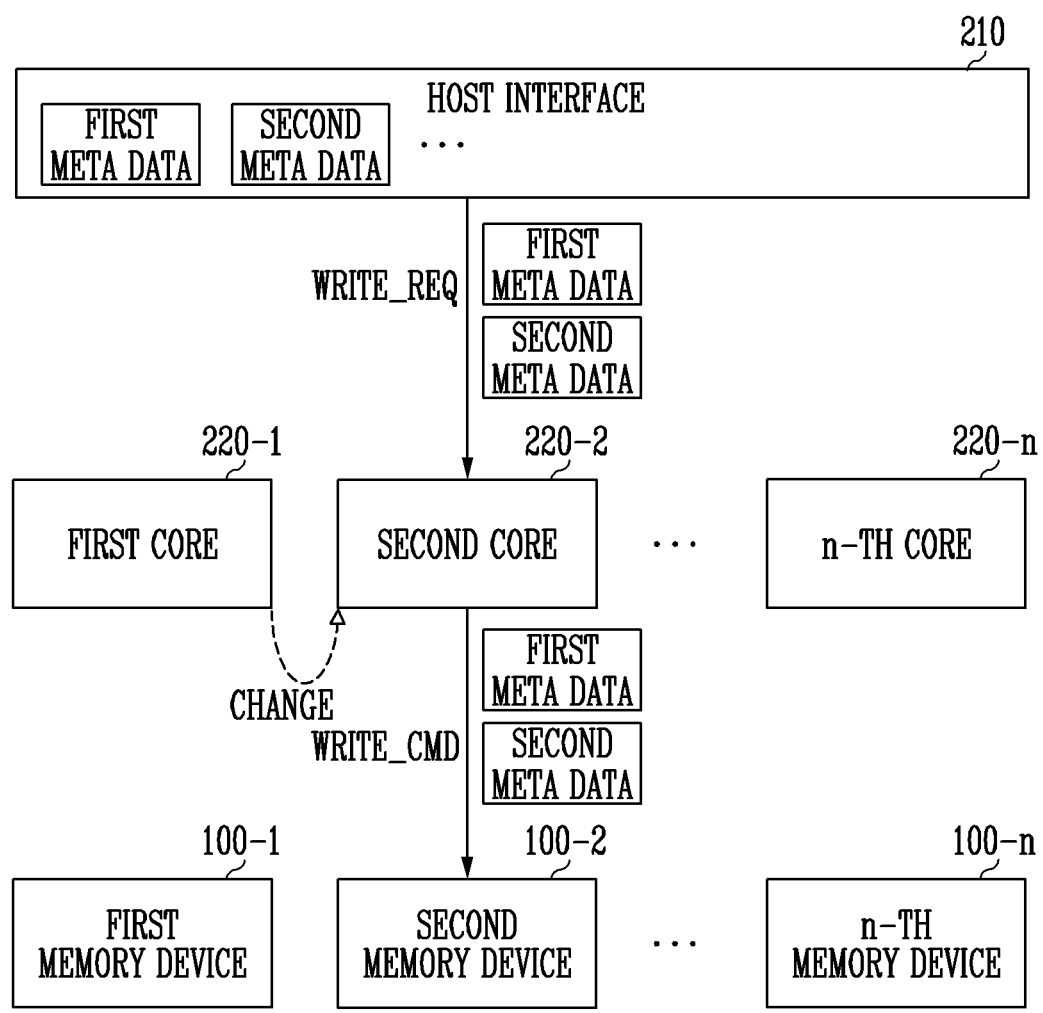
FIG. 3 is a diagram illustrating an example of changing a core to store a plurality of meta data according to an embodiment of the present disclosure.

FIG. 3 is a diagram illustrating an example of changing a core to store a plurality of meta data according to an embodiment of the present disclosure.

Referring to FIG. 3, a host interface 210 may determine a core to perform a write operation on the plurality of meta data based on the number of operations for storing the first meta data by any one core.

In an embodiment, when the number of operations for storing the first meta data by any one core exceeds a threshold value, the core used to store the plurality of meta data in the plurality of memory devices may be changed. For example, when the number of operations for storing the first meta data by the first core 220-1 exceeds the threshold value, the host interface 210 may change the core used to store the plurality of meta data to the second core 220-2. Thereafter, the host interface 210 may provide a write request for the plurality of meta data to the second core 220-2. In addition, when the number of operations for storing the first meta data by the second core 220-2 exceeds the threshold value, the host interface 210 may change the core used to store the plurality of meta data to a core other than the first core 220-1 and the second core 220-2. As described above, the host interface 210 may change a core to be provided the write request for the meta data whenever the number of storages of the first meta data by a specific core exceeds the threshold value. When the number of storages of the first meta data by all cores exceeds the threshold value, the host interface 210 may provide a write request for the meta data to the first core 220-1. Meanwhile, in the above-described example, the core is changed according to a sequential numbering scheme for the cores, but the disclosure is not necessarily limited thereto, and different methods may use different criteria to change the order in which cores are used according to different embodiments.

In an embodiment, the host interface 210 may adjust the threshold value based on a lifespan of the plurality of memory devices 100-1 to 100-n. For example, as the threshold value increases, a frequency in which the core is changed may decrease. As a result, an operation speed of the storage device 50 may be increased, but damage may occur in terms of the lifespan due to an imbalance of a wear degree of the memory devices. In contrast, as the threshold value decreases, the frequency in which the core is changed may increase. As a result, the degree of wear in the memory devices may be consumed in a balanced manner and thus loss of lifespan may be reduced, but the operation speed of the storage device 50 may be decreased. Therefore, the host interface 210 may adjust the threshold value to be increase as the lifespan expectancy of the plurality of memory devices 100-1 to 100-n increases. In addition, the host interface 210 may adjust the threshold value to be decreased as the lifespan expectancy of the plurality of memory devices 100-1 to 100-n decreases.

Figure 4:
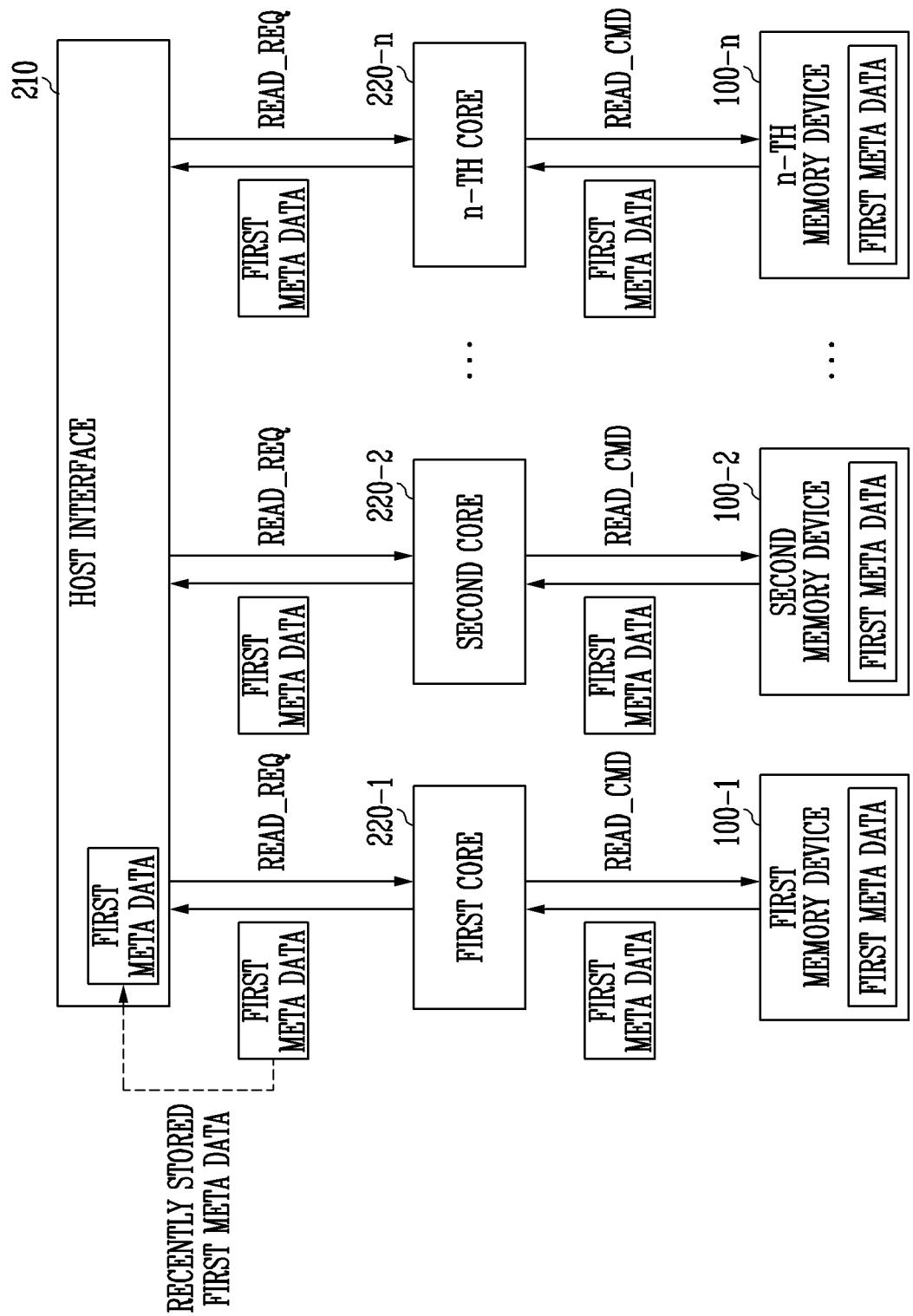
FIG. 4 is a diagram illustrating an example of determining recently stored first meta data according to an embodiment of the present disclosure.

FIG. 4 is a diagram illustrating an example of determining recently stored first meta data according to an embodiment of the present disclosure.

Referring to FIG. 4, during a booting operation, a host interface 210 may select a plurality of cores 220-1 to 220-n to read a plurality of meta data from a plurality of memory devices 100-1 to 100-n, respectively.

In an embodiment, the host interface 210 may receive the first meta data read from the plurality of memory devices 100-1 to 100-n in which the first meta data is stored. Specifically, the host interface 210 may select the cores that has controlled the write operation on the plurality of meta data to read the first meta data stored in each of the memory devices controlled by the selected cores. In FIG. 4, it is assumed that all of the plurality of cores 220-1 to 220-n perform write operations on the plurality of meta data. For example, the host interface 210 may provide a read request READ_REQ for the first meta data to the plurality of cores 220-1 to 220-n. The plurality of cores 220-1 to 220-n may generate a read command READ_CMD corresponding to the read request READ_REQ, and provide the read command READ_CMD to the plurality of memory devices 100-1 to 100-n, respectively. The first meta data read from the plurality of memory devices 100-1 to 100-n may be transferred to the host interface 210 through the plurality of cores 220-1 to 220-n. In an embodiment, the plurality of memory devices 100-1 to 100-*n* may read the first meta data according to an interleaving method.

In an embodiment, the host interface 210 may determine the most recently stored first meta data from among the read first meta data based on the number of storages of the read first meta data. An order in which the read first meta data is transferred to the host interface 210 may differ according to a read speed of each of the plurality of memory devices 100-1 to 100-*n*. For example, when the read speed of the memory device is high, the first meta data read from the corresponding memory device may be preferentially transferred earlier to the host interface 210. In contrast, when the read speed of the memory device is low, the first meta data read from the corresponding memory device may be transferred to the host interface 210 more slowly than other first meta data. The host interface 210 may determine the most recently stored first meta data based on the number of storages of the sequentially received first meta data. In FIG. 4, it is assumed that the first meta data read from the first memory device 100-1 is the fastest transferred to the host interface 210.

In an embodiment, the host interface 210 may determine first meta data having the number of storages other than an integer multiple of the threshold value, from among the read first meta data, as the most recently stored first meta data. For example, when the threshold value is 5 and the number of storages of the first meta data received through the first core 220-1 is 3, the host interface 210 may determine the first meta data received through the first core 220-1 as the most recently stored first meta data. That is, when the number of storages of the first meta data received through the first core 220-1 is not an integer multiple of the threshold value, the first core 220-1 may be determined as the core currently performing the write operation on the plurality of meta data. Therefore, the first meta data received through the first core 220-1 may be determined as the most recently stored first meta data.

In an embodiment, when the first meta data having the number of storages other than the integer multiple of the threshold value does not exist, the host interface 210 may determine first meta data having the greatest number of storages corresponding to the integer multiple of the threshold value as the most recently stored first meta data from among the read first meta data. For example, when the first meta data received through the first core 220-1 is an integer multiple of the threshold value, the host interface 210 may determine whether the first meta data received through other cores is also an integer multiple of the threshold value. When all first meta data received through the plurality of cores 220-1 to 220-*n* are integer multiple of the threshold value, the first meta data having the greatest number of storages may be determined as the most recently stored first meta data. That is, when all first meta data are the integer multiples of the threshold value, it may be determined that the booting operation is performed at a time point when the core that performs the write operation on the plurality of meta data needs to be changed. In this case, the first meta data having the greatest number of storages may be determined as the most recently stored first meta data.

Figure 5:
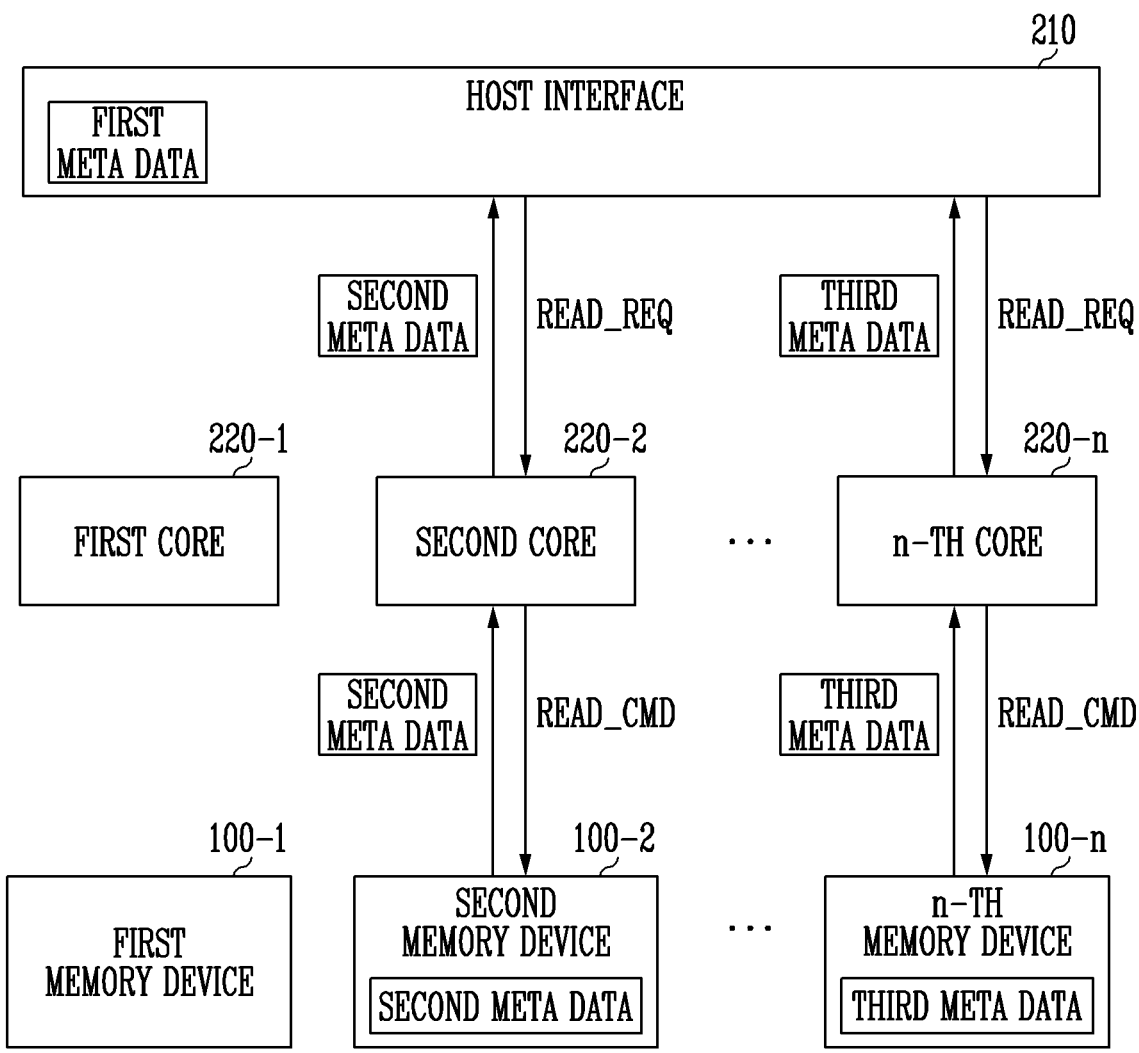
FIG. 5 is a diagram illustrating an example of reading remaining meta data and not reading first meta data according to an embodiment of the present disclosure.

FIG. 5 is a diagram illustrating an example of reading remaining meta data and not reading first meta data according to an embodiment of the present disclosure.

Referring to FIG. 5, a host interface 210 may determine memory devices in which each of the remaining meta data is most recently stored, based on the number of storages of each of the plurality of meta data, which is included in the most recently stored first meta data. The host interface 210 may select the cores that control the determined memory devices to read each of the remaining meta data from the determined memory devices.

In an embodiment, the host interface 210 may determine the memory device in which the second meta data is most recently stored, based on the number of storages of the second meta data, which is included in the most recently stored first meta. For example, the host interface 210 may determine the memory device in which the second meta data is most recently stored according to a modular operation method using the number of storages of the first meta data, the number of storages of the second meta data, the threshold value, and the like, which are included in the most recently stored first meta data as variables. For example, when the memory device in which the second meta data is the most recently stored is determined as the second memory device 100-2, the host interface 210 may select the second core 220-2 to read the second meta data from the second memory device 100-2.

In addition, the host interface 210 may determine a memory device in which third meta data is most recently stored according to a modular operation method using the number of storages of the first meta data, the number of storages of the second meta data, the threshold value, and the like, which are included in the most recently stored first meta data as variables. For example, when the memory device in which the third meta data is most recently stored is determined as an n-th memory device 100-*n*, the host interface 210 may select an n-th core 220-*n* to read the third meta data from the n-th memory device 100-*n*.

In the above-described examples, only the examples of reading the second meta data and the third meta data have been described, but methods of reading other meta data may be identically applied.

Therefore, according to an embodiment of the present disclosure, after determining the recently stored first meta data, the remaining meta data may be read based on the number of storages of each meta data, which is included in the determined first meta data. Therefore, the number of times the remaining meta data are read may be reduced, thereby improving performance of a storage device 50.

Figure 6:
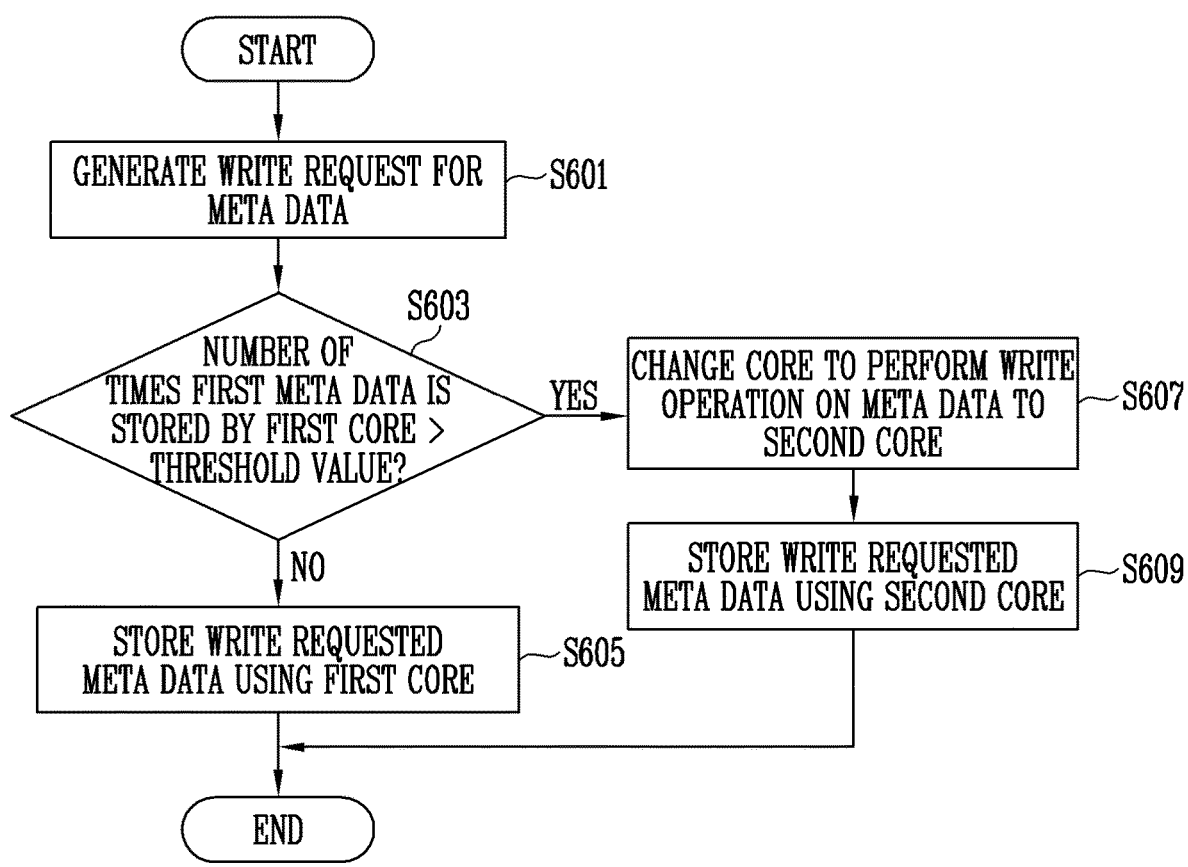
FIG. 6 is a flowchart illustrating a method of operating a storage device according to an embodiment of the present disclosure.

FIG. 6 is a flowchart illustrating a method of operating a storage device according to an embodiment of the present disclosure.

The drawing shown in FIG. 6 may be performed by, for example, a storage device 50 shown in FIG. 1.

Referring to FIG. 6, in step S601, when generating new meta data or updating existing meta data, the storage device 50 may generate a write request for corresponding meta data. The storage device 50 assumes that a first core 220-1 performs the write operation on the plurality of meta data at a time point when the write request is generated.

In step S603, the storage device 50 may determine whether the number of operations for storing the first meta data by the first core 220-1 exceeds a threshold value.

When the number of operations for storing the first meta data by the first core 220-1 does not exceed the threshold value according to the determination result of step S603, the storage device 50 may perform step S605. In step S605, the storage device 50 may store the write requested meta data using the first core 220-1 in the first memory device 100-1, which is controlled by the first core 220-1.

When the number of operations for storing the first meta data by the first core 220-1 exceeds the threshold value according to the determination result of step S603, the storage device 50 may perform step S607. In step S607, the storage device 50 may change the core that performs the write operation on the meta data from the first core 220-1 to the second core 220-2.

In step S609, the storage device 50 may store the write requested meta data using the second core 220-2 in the second memory device 100-2, which is controlled by the second core 220-2.

Figure 7:
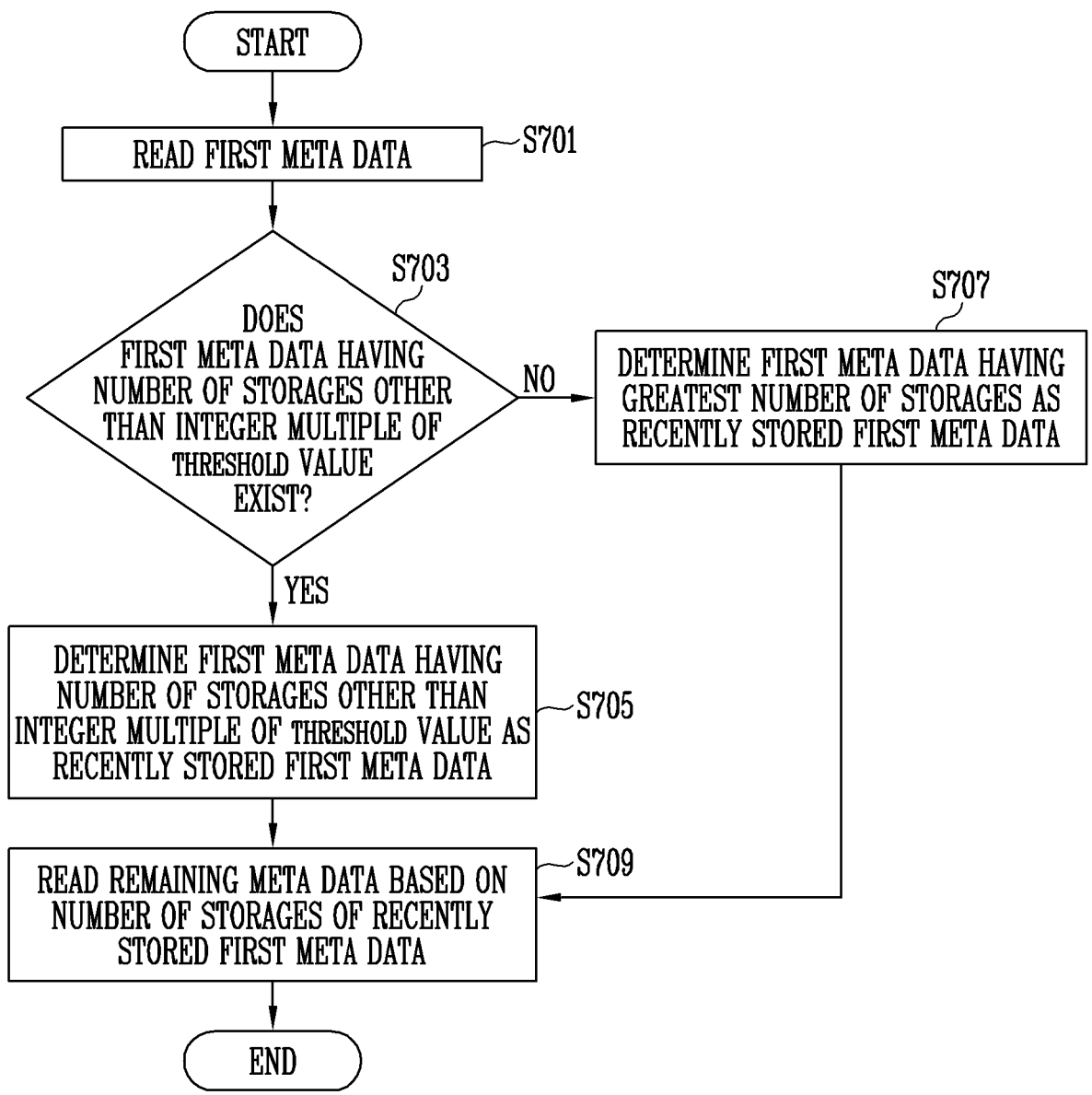
FIG. 7 is a flowchart illustrating a method of reading a plurality of meta data during a booting operation according to an embodiment of the present disclosure.

FIG. 7 is a flowchart illustrating a method of reading a plurality of meta data during a booting operation according to an embodiment of the present disclosure.

The drawing shown in FIG. 7 may be performed by, for example, the storage device 50 shown in FIG. 1.

Referring to FIG. 7, in step S701, a storage device 50 may read a first meta data from a plurality of memory devices 100-1 to 100-n. For example, the storage device 50 may read the first meta data from the memory devices controlled by the cores performing the write operations on the first meta data.

In step S703, the storage device 50 may determine whether the first meta data having a number of storages other than an integer multiple of the threshold value exists among the read first meta data.

According to a determination result of step S703, when the first meta data having a number of storages other than an integer multiple of the threshold value exists, in step S705, the storage device 50 may determine the corresponding first meta data as the recently stored first meta data.

In contrast, according to the determination result of step S703, if the first meta data having a number of storages other than an integer multiple of the threshold value does not exist, then in step S707, the storage device 50 may determine the first meta data having the greatest number of storages as the recently stored first meta data.

In step S709, after determining the recently stored first meta data, the storage device 50 may read the remaining meta data based on the number of storages of the recently stored first meta data.

Figure 8:
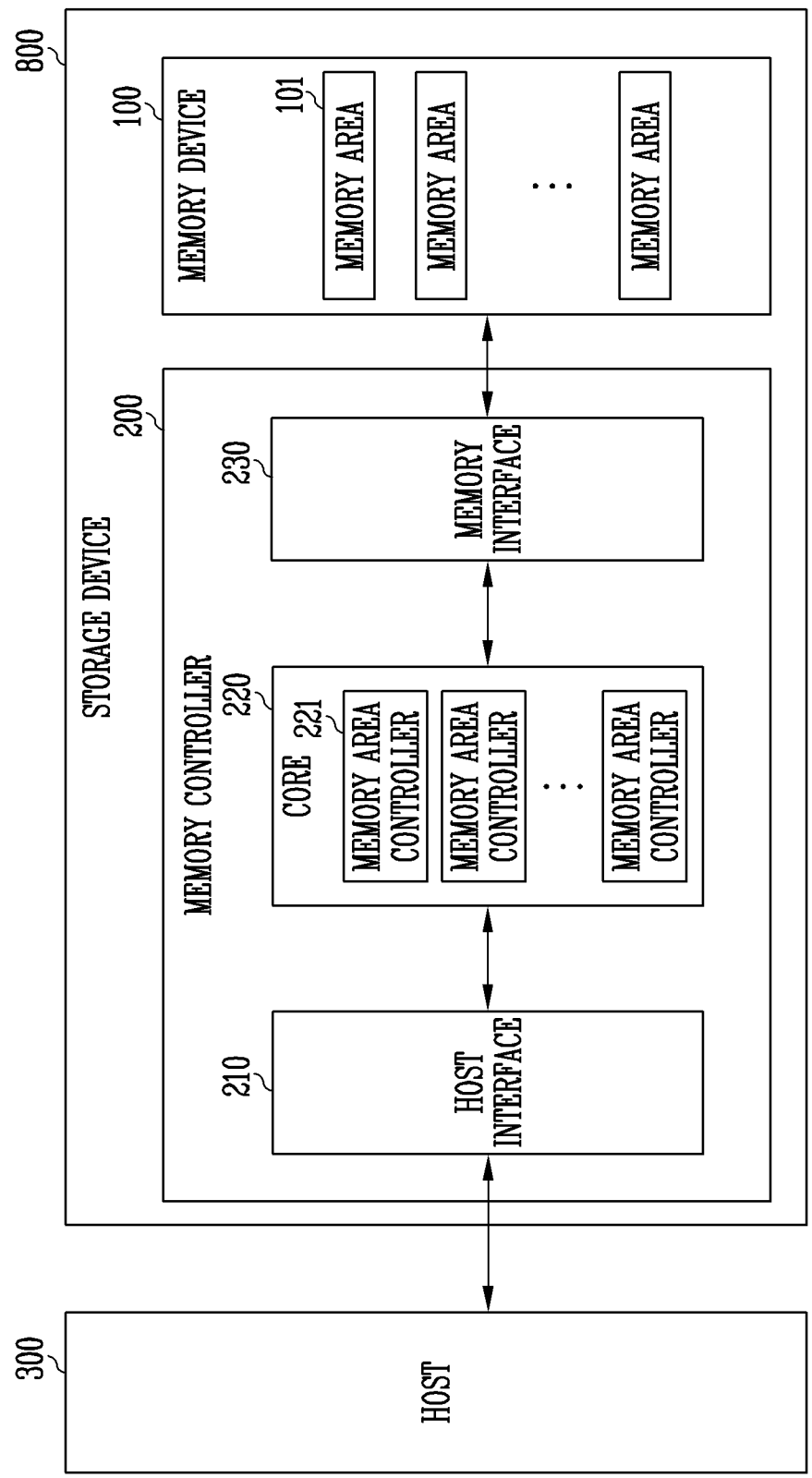
FIG. 8 is a diagram illustrating another example of a storage device according to an embodiment of the present disclosure.

FIG. 8 is a diagram illustrating another example of a storage device according to an embodiment of the present disclosure.

Compared with a storage device 50 of FIG. 1, a storage device 800 shown in FIG. 8 includes a plurality of memory area controllers 221 in one core rather than a plurality of cores 220-1 to 220-n.

Referring to FIG. 8, a memory device 100 may include a plurality of memory areas 101. The memory area 101 may indicate an area storing data, such as a plurality of pages or a plurality of memory blocks. The description of the plurality of memory devices 100-1 to 100-n of FIG. 1 may be substantially the same as the same-numbered elements in the memory device 100 of FIG. 8. In addition, the description of the memory controller 200, the host interface 210, and the memory interface 230 in FIGS. 1 to 7 may also be substantially the same as the memory controller 200, the host interface 210, and the memory interface 230 of FIG. 8.

In an embodiment, each of the plurality of memory area controllers 221 may drive the FTL.

FIG. 1 shows an example in which the host interface 210 controls the plurality of meta data using the plurality of cores 220-1 to 220-n, but FIG. 8 shows an example in which the host interface 210 controls the plurality of meta data using the plurality of memory area controllers 221. Therefore, with respect to the plurality of cores 220-1 to 220-n, the descriptions related to the meta data in FIGS. 1 to 7 may also be substantially the same as applied to the plurality of memory area controllers 221 of FIG. 8.

For example, the host interface 210 may select any one memory area controller 221 from among the plurality of memory area controllers 221 to store the plurality of meta data in the memory area 101, based on the number of operations for storing the first meta data.

In an embodiment, during the booting operation, the host interface 210 may identify and read the memory area 101 in which each of the remaining meta data is the most recently stored based on the number of storages of each of the plurality of meta data included in the most recently stored first meta data.

What is claimed is:

1. A storage device comprising:
   a plurality of memory devices;
   a plurality of cores controlling the plurality of memory devices; and
   a host interface configured to select a first core of the plurality of cores to store a plurality of meta data in a memory device controlled by the first core, and configured to switch to a second core from the plurality of cores to store the plurality of meta data in a memory device controlled by the second core, when the number of operations for storing a first meta data, from among the plurality of meta data, by the first core exceeds a threshold value,
   wherein the first meta data includes a number of storages of each of the plurality of meta data, and
   wherein the host interface increases the number of storages of each of the plurality of meta data included in the first meta data, when the plurality of meta data is stored in the memory device controlled by the first core.

2. The storage device of claim 1, wherein the first core controls the memory device controlled by the first core to store the first meta data together with a second meta data, from among the plurality of meta data, when the second meta data is different from the first meta data and is stored in the memory device controlled by the first core.

3. The storage device of claim 1, wherein the first meta data is stored in a size capable of being read from the plurality of memory devices according to an interleaving method.

4. The storage device of claim 1, wherein the host interface adjusts the threshold value based on a lifespan of the plurality of memory devices.

5. The storage device of claim 1, wherein during a booting operation, the host interface receives the first meta data read from the memory devices from among the plurality of memory devices in which the first meta data is stored, and determines the most recently stored first meta data among the read first meta data based on the number of storages of the read first meta data.

6. The storage device of claim 5, wherein the host interface determines a first meta data, from among the read first meta data, having a number of storages that is not an integer multiple of the threshold value as the most recently stored first meta data.

7. The storage device of claim 6, wherein the host interface determines a first meta data with a number of storages that is an integer multiple of the threshold value and has the largest number of storages as the most recently stored first meta data from among the read first meta data, in the absence of a first meta data having a number of storages that is not an integer multiple of the threshold value.

8. The storage device of claim 5, wherein the host interface determines a memory device in which a second meta data, different from the first meta data, is most recently stored based on the number of storages of each of the plurality of meta data included in the most recently stored first meta data, and selects a third core of the plurality of cores to read the second meta data from the determined memory device controlled by the third core.

9. A storage device comprising:
a first memory device;
a second memory device;
a first core configured to control the first memory device;
a second core configured to control the second memory device; and
a host interface configured to select the first core to store a plurality of meta data in the first memory device, and to select the second core to store the plurality of meta data in the second memory device, when the number of operations for storing a first meta data from among the plurality of meta data by the first core exceeds a threshold value,
wherein the first meta data includes a number of storages for each of the plurality of meta data, and
wherein the host interface increases the number of storages of each of the plurality of meta data included in the first meta data when the plurality of meta data are stored in the first memory device.

10. The storage device of claim 9, wherein the first core controls the first memory device to store the first meta data and a second meta data together, when the second meta data different from the first meta data is stored in the first memory device.

11. The storage device of claim 9, wherein during a booting operation, the host interface receives the first meta data read from each of the first memory device and the second memory device, and determines the most recently stored first meta data from among the read first meta data based on the number of storages of the read first meta data.

12. The storage device of claim 11, wherein the host interface determines a memory device in which a second meta data different from the first meta data from among the plurality of meta data is most recently stored based on the number of storages of each of the plurality of meta data included in the most recently stored first meta data, and selects a core from among the first core and the second core to read the second meta data from the determined memory device controlled by the selected core.

13. A storage device comprising:
a memory device including a plurality of memory areas;
a plurality of memory area controllers respectively controlling the plurality of memory areas; and
a host interface configured to select a first memory area controller to store a plurality of meta data in the plurality of memory areas from among the plurality of memory area controllers based on a number of operations for storing a first meta data from among the plurality of meta data by a second memory area controller from among the plurality of memory area controllers,
wherein the first meta data includes the number of storages of each of the plurality of meta data, and
wherein the host interface increases the number of storages of each of the plurality of meta data included in the first meta data, when the plurality of meta data is stored in the plurality of memory areas controlled by the first memory area controller.

* * * * *